Dec. 11, 1945.  E. W. PERRY  2,390,733
AIRPLANE PROPELLER
Filed April 13, 1942  2 Sheets-Sheet 1
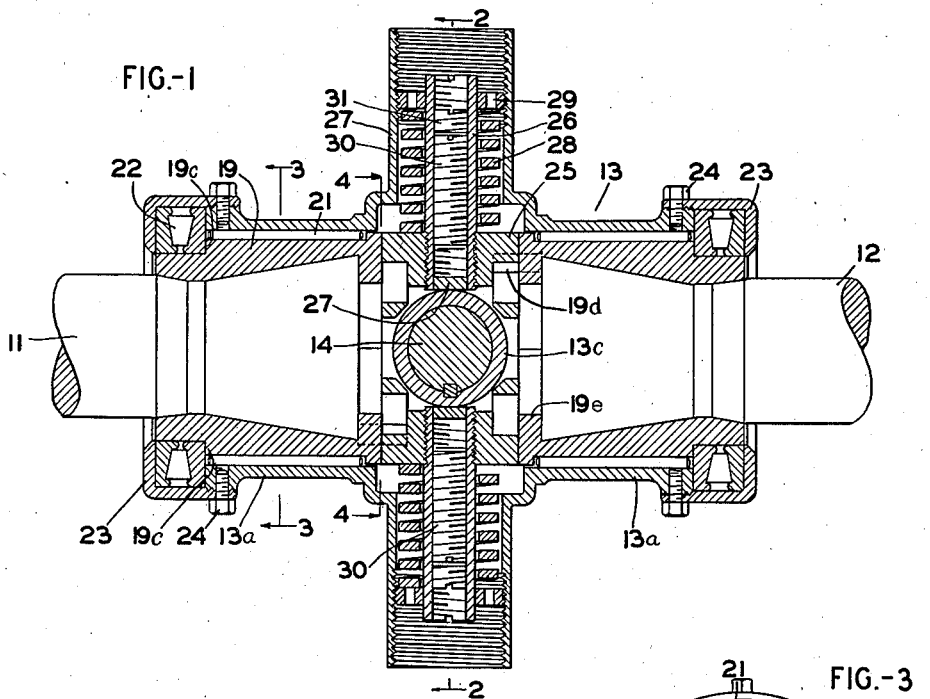
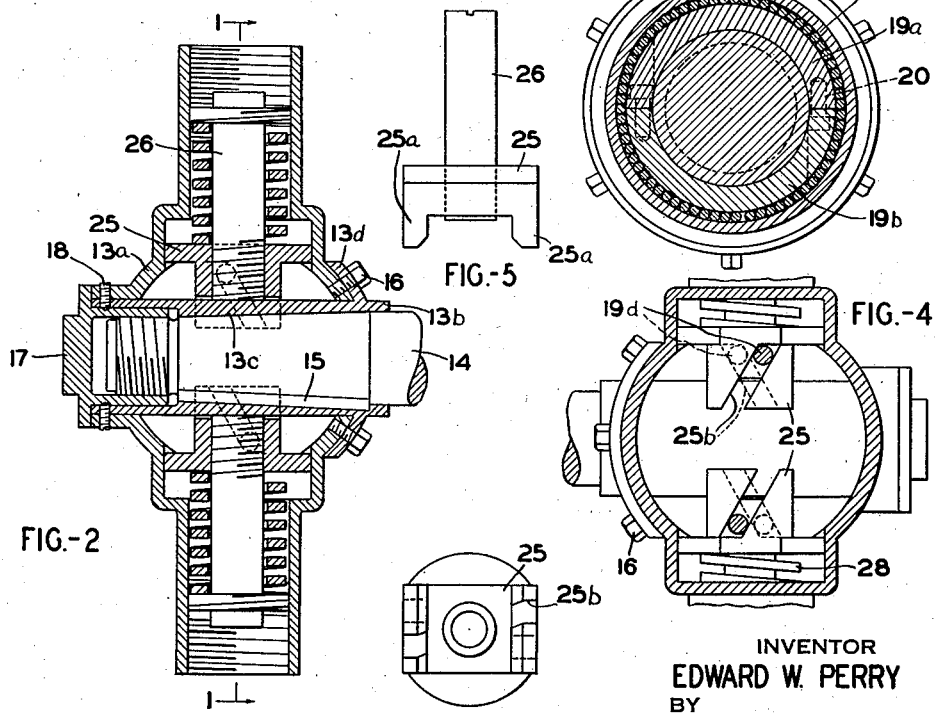
INVENTOR
EDWARD W. PERRY
BY
Hyde and Meyer
ATTORNEYS Dec. 11, 1945.  E. W. PERRY  2,390,733
AIRPLANE PROPELLER
Filed April 13, 1942  2 Sheets-Sheet 2

INVENTOR
EDWARD W. PERRY
BY
Hyde and Meyer
ATTORNEYS

Patented Dec. 11, 1945

2,390,733

UNITED STATES PATENT OFFICE 2,390,733

AIRPLANE PROPELLER

Edward W. Perry, Euclid, Ohio, assignor of thirty percent to Wallace A. Stuart, Cleveland Heights, and thirty percent to Theodore F. Schilling, Elyria, Ohio Application April 13, 1942, Serial No. 438,775

4 Claims. (Cl. 170—162)

This invention relates to improvements in variable pitch propellers for use on aircraft.

One of the objects of the present invention is to provide a variable pitch constant speed propeller which operates in response to centrifugal force controlled by engine speed and in which means is provided for holding the propeller blades at a minimum pitch while taking off and climbing.

Another object of the present invention is to provide a variable pitch propeller provided with adjusting devices controlled by engine speed and wherein the movement of the blades is interlocked so that all blades move in unison and there are no unbalanced forces.

Another object and advantage of the present invention is to provide means for automatically varying the pitch of the propeller blades, which is simple and rugged in design, cheap to construct, and substantially foolproof in operation.

Other objects and advantages of the present invention will be apparent from the accompanying drawings and description and the essential features thereof will be summarized in the claims.

Figure 11:
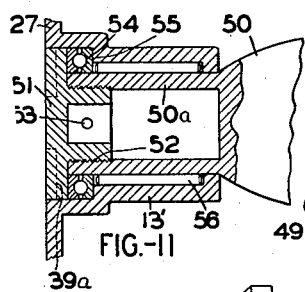
Figure 7:
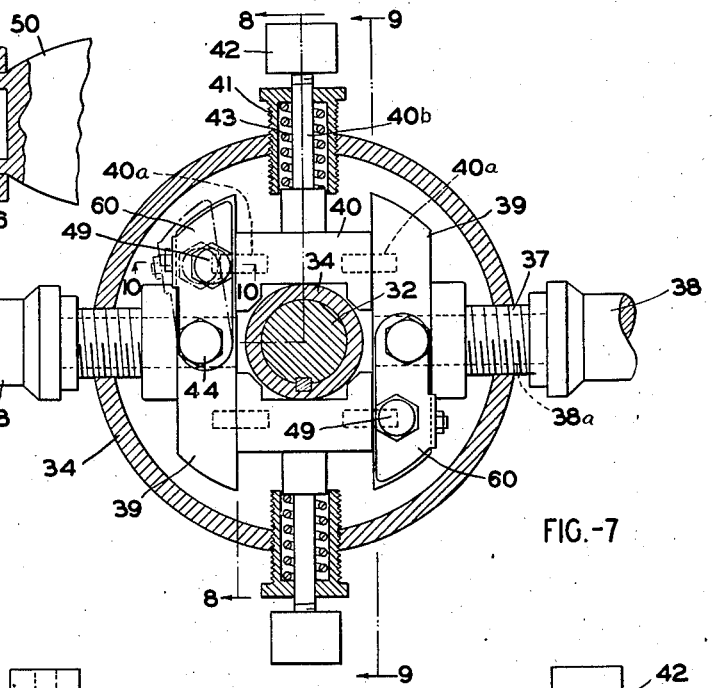
Figure 8:
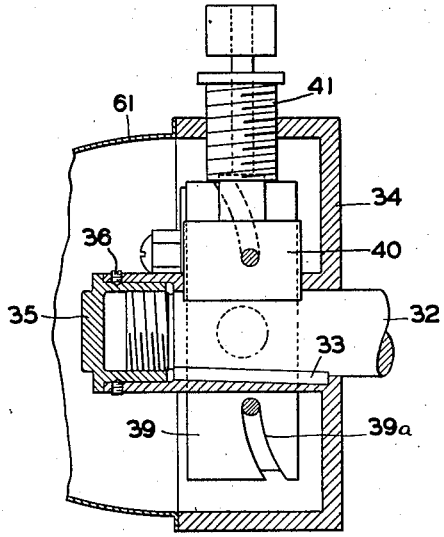
Figure 9:
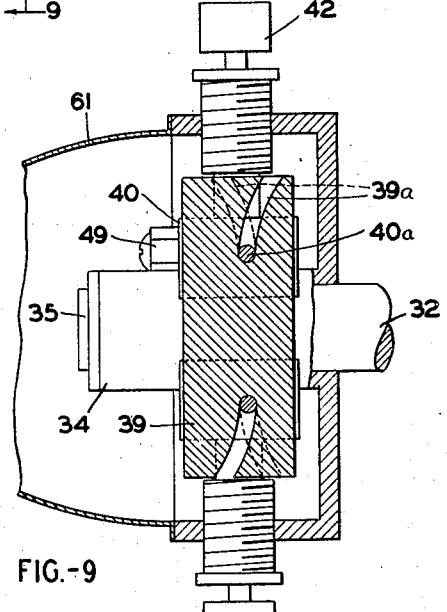
Figure 10:
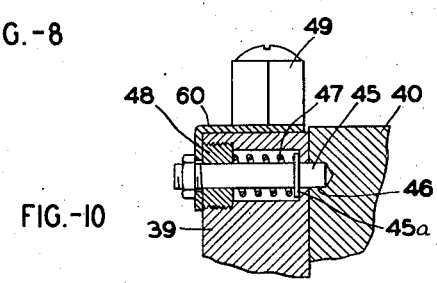

In the drawings, Fig. 1 is a sectional view through one embodiment of my invention, taken axially of the propeller blades and substantially along the line 1—1 of Fig. 2; Fig. 2 is a sectional view of the same device taken along the line 2—2 of Fig. 1; Figs. 3 and 4 are sectional views taken along similarly numbered lines of Fig. 1; Figs. 5 and 6 are elevational and end views respectively of a pitch-controlling member shown in Figs. 1, 2 and 4; Figs. 7 to 10 show a modified form of my invention wherein Fig. 7 is a sectional view taken in a position similar to Fig. 1 of the first modification; Figs. 8 and 9 are sectional views taken along similarly numbered lines of Fig. 7; and Fig. 10 is an enlarged fragmental detail view taken along the line 10—10 of Fig. 7; Fig. 11 is a modified form of blade securing means.

At present many planes, including nearly all light planes, use a fixed blade propeller which has a permanent pitch angle which is most suited for the overall operation of the particular plane. The pitch of the blade is necessarily a compromise so that the plane can have a suitable take-off, climb, cruising range and maximum speed for general usage. Since each of these functions requires a different pitch angle for ideal plane operation it may be assumed that while the overall efficiency for any given design on the market is the best obtainable with a fixed pitch propeller blade, the individual plane operations listed above could be improved materially if the pitch of the blades could be varied according to the operations the plane was performing. The ideal solution would be a propeller that could develop the full engine power at all times so that each of the operations mentioned could be performed at the most efficient engine speed and blade pitch angle for the particular plane.

The operation of taking off and climbing requires a greater effort than is needed for normal cruising at a fixed level. At the same time at take-off the blades are moving through practically still air and while climbing the plane is moving at a slower speed through the air than when cruising. Therefore a lower pitch angle of the blades is desirable during take-off and climbing followed by an increase in pitch angle when the plane is cruising, because at that time the plane is moving at considerable speed and a greater pitch angle is necessary to enable the blades to get a proper bite in the slipstream. I take advantage of these principles in the present design in that my propeller is so constructed that the blades remain at a minimum pitch angle during take-off and climb, with means controlled by centrifugal force for increasing and controlling the blade pitch angle while cruising.

Many of the principles of my invention are applicable to propellers having any number of blades commercially practicable, but for purposes of illustration I have used a two-blade propeller with no intention of unduly limiting the claims of my invention.

In the device shown in Figs. 1 to 6, propeller blades 11 and 12 are mounted in a hub 13 which in turn is secured rigidly for rotation with the engine shaft 14. As best seen in Fig. 2, the hub 13 comprises a generally cylindrical portion 13a and a portion 13b having a tubular part 13c secured to the shaft 14 by means of the key 15. The parts 13b also has a flange 13d which is secured to the hub portion 13a by means of the cap screws 16. A shaft nut 17 is threaded to the end of shaft 14 and the nut is received in the end of the tubular part 13c and retained in position by set screws 18 which pass through the parts 13a and 13c engaging in the sides of the nut 17.

The blades are carried by the hub 13 in a manner preventing movement of the blades axially but permitting rotative movement of the blades in the hub. To this end a clamp 19 is tightly secured to the inner tapered ends of each of the blades 11 and 12. The construction is the same for each and therefore only one will be described. Referring to Fig. 3, it will be noted that the blade clamp comprises two semicylindrical portions 19a and 19b secured together by the Allen set screws 20. The blades are immovable in the clamps 19. Radial friction is absorbed by the needle or roller bearings 21 between the outer wall of the clamp and the inner wall of the cylindrical portion 13a of the hub. Friction due to axial thrust of the propeller blades is taken by the roller bearings 22 which are held against the abutments 19c of the clamps by means of caps 23 which are threaded onto the ends of the hub portions 13a and fixed in position by cap screws 24.

The means provided for controlling the pitch of the blades 11 and 12 as they rotate relative to the hub 13 comprises a pair of cam blocks 25 which move in a plane parallel to the plane of rotation of the blades and in a line substantially at right angles to the axes of blades 11 and 12. These cam blocks are rectangular in plan view and somewhat U-shape in side elevational view as shown in Fig. 5. In the side portions 25a of the blocks are provided slots 25b at predetermined angles, the slot in one side portion being inclined in the opposite direction to the slot in the other side portion as best seen in Fig. 4 so as to cause pitch increasing or pitch decreasing movement in blades 11 and 12 as the cam blocks move. Interlocked in the cam slots are pins 19d which are carried in the end flanges 19e of the blade clamps. There are two of these pins 19d in each blade clamp and as best seen in Fig. 4 one of the pins engages in a cam block on one side of shaft 14 and the other engages in the opposite cam block. This is the arrangement on each side of each cam block and permits a rigid interlocking arrangement compelling coordinated movement of the two blades at all times in the same direction and in the same amount.

Rigidly connected with each cam block is a tubular spring guide 26 which is threaded through a central opening in its associated cam block and the inner end of which is closed by a plug 27. Formed integrally with the hub portion 13a in the present instance (or as a separate piece if desired) is a spring housing 27. Within this housing is a compression spring 28 surrounding the tubular spring guide 26. A spring compression adjusting nut 29 annular in form lies between the members 26 and 27 and is threaded in the inner wall of the housing 27. This nut is for the purpose of adjusting the compression of spring 28 exactly to the desired point. The spring 28 thus provides yieldable means preventing movement of cam blocks 25 and the tube 26 away from the shaft 14.

The movement of the pitch controlling cam blocks 25 depends upon the interplay of centrifugal forces due to the rotation of shaft 14 and the resistance provided by springs 28. The parts connected with cam blocks 25 must therefore be so chosen and arranged and coordinated with the spring 28 so that the desired movement of cam blocks 25 will take place. To this end the weight of the parts connected with cam blocks 25 must be carefully chosen and adjusted and preferably means is provided to adjust and set such weights after the device is assembled. To this end a weight 30 is mounted in each of the tubular spring guides 26 and fixed adjusting means for this weight is provided by threading the cylindrical weight in the inner walls of the tubes 26 and providing lock members 31 also threaded in the members 26. Thus the weights 30 may be turned to the desired position and locked there by the members 31.

In the device shown in Figs. 1 to 6, the parts are so arranged and adjusted that the engine speed normally used by the particular plane during take-off and climb will not create sufficient centrifugal force to move the cam blocks 25 outwardly against the action of springs 28. In other words, during these operations the blades 11 and 12 will be held in their position of minimum pitch because the springs 28 will hold the cam blocks 25 in their innermost position as shown in Fig. 1 with the plugs 27 engaging the hub portion 13c.

The device of Figs. 1 to 6 just described will therefore hold the propeller blades at minimum pitch during a take-off and climb at the engine speed normally used for that purpose. When the plane has reached cruising level by dropping the nose of the plane or increasing the throttle setting the engine is speeded up to the point where centrifugal force will move the cam blocks 25 outwardly overcoming the springs 28 to a greater or lesser degree. As the blocks 25 move outwardly the slots 25b engage against the pins 19d so as to rotate the blades 11 and 12 relative to hub 13 increasing the pitch of the blades by equal amounts. This gives a better bite for the blades at cruising speed and develops the full power of the engine. My device now acts as a governor during the normal cruising operations of the plane so as to maintain constant speed in the following fashion. If the throttle is opened in an attempt to speed up the motor the increased speed at once creates an additional centrifugal force acting on the cam blocks 25 to increase the pitch angle of the propeller blades. This increases the load on the engine and therefore decreases the speed back to normal. In a similar manner if the plane should start to climb, thus decreasing the engine speed, the cam blocks 25 would move inwardly in response to the decrease in centrifugal force acting upon them. This would decrease the pitch of the propeller blades permitting the engine to speed up to normal. I have provided, therefore, a definitely acting automatic mechanism for maintaining a constant speed which is the most efficient for normal operation.

A modification is shown in Figs. 7 to 10 which operates on the same principle but in which the pins are carried by the movable pitch controlling blocks and the cam slots are rigid with the propeller blades. Here the engine shaft 32 is attached by key 33 to the hub 34. The nut 35 is threaded on the end of the shaft and is secured to the tubular extension of the hub by the set screws 36. Threaded into the hub on opposite sides are the sleeve bearings 37 through which pass the inner ends 38a of the propeller blades 38. Rigidly secured on the inner end of each propeller blade is a block 39 which is provided with slots 39a. The slots in the two blocks 39 are inclined in opposite directions as best seen in Fig. 9 so that both of the blades 38 are turned in the same direction, that is, either in pitch increasing or pitch decreasing direction simultaneously. Engaged in the slots 39a are the pins 40a which are rigidly carried by the blocks 40. There are two of these blocks which move in a plane parallel to the plane of rotation of the blades and in a linear direction transverse to the blade axes. These blocks are alike and one only will be described. The block 40 carries two pins 40a adapted to engage the slots 39a in the blocks 39 on opposite sides of the block 40. Block 40 carries a stem 40b which passes through a spring housing 41 threaded in the hub 34. On the outer end of the stem 40b is a weight 42 threaded on the stem 40b so that its position with respect to shaft 32 may be adjusted. A compression spring 43 lies in the spring housing surrounding the stem 40b and engaged between a shoulder on the stem and the end wall of the spring housing. This spring urges the block 40 inwardly to a limiting position shown in Fig. 7 in engagement with a portion of the hub 34, this position corresponding to the minimum pitch for blades 38. Centrifugal force acting upon the blocks 40 and the weights 42 will move the blocks 40 outwardly at a predetermined speed of the shaft 32 against the resistance of springs 43. Such radially outward movement of blocks 40 will cause the pins 40a to travel outwardly along the slots 39a so as to increase the pitch of the propeller blades as the speed of shaft 32 increases.

Antifriction bearings may be supplied to resist radial and axial friction of the blades 38 corresponding to the bearings indicated at 21 and 22 in the first described form but such details need not be shown here.

As in the first described form of my device it is obvious that the rigid blocks 39 and 40 provide a positive lock between the blades 38 so that the blades must always move in synchronism causing the pitch of the blades to be increased or decreased by exactly the same amount for each blade.

Here as in the first described modification the tension on spring 43 may be so adjusted that the weights 42 will not be thrown outwardly at normal take-off and climbing speeds. However, I have here shown another form of control over blade pitch which is equally applicable to the first modification although not illustrated there. In the present form I provide positive locking means for holding the blades at a predetermined minimum pitch during take-off and climb adapted to be released or unlocked at a predetermined speed so that if necessary or desirable the plane might climb using a speed of shaft 32 equal to or greater than that used during normal cruising. To produce this result it is only necessary to provide locking means which will hold the blocks 40 against outward movement until shaft 32 reaches a predetermined speed suitable for releasing the locking means.

This locking means comprises a member 60 pivoted at 44 on each block 39. This member carries a pin 45 which enters a hole 46 in block 40 when the parts are in minimum pitch position as shown in Fig. 7. These details are best shown in Fig. 10. A spring 47 is engaged between a collar 45a on the pin and a plug 48 threaded in the block 39. This is a compression spring which normally urges the pin 45 into locking position in the hole 46 and this corresponds to the full line position of member 60 as shown in Fig. 7. A weight 49 is mounted on the member 60 and is so calculated with respect to spring 47 that the member 60 is thrown outwardly to the dot-dash position of Fig. 7 when shaft 32 reaches a predetermined speed. This movement of member 60 outwardly will move pin 45 out of the hole 46, thus releasing the block 40 for its intended movement radially with respect to shaft 32 so as to change the pitch of blades 38.

Here as in the first described modification the arrangement is such that upon release of the locking member 60 the blocks 40 and weights 42 automatically hold a substantially constant speed of shaft 32. If the speed of shaft 32 increases blocks 40 move outwardly causing the pins 40a to travel in the slots 39a thus moving the blocks 39 to increase the pitch of blades 38. The blades then take a greater bite of air thus placing a greater load on the engine and reducing the speed of shaft 32 to normal. On the other hand if the speed of shaft 32 decreases, the blocks 40 will move inwardly, thus causing a decrease in the pitch of blades 38 which decreases the load on the engine which permits shaft 32 to increase its speed.

Attention is called to the fact that when this automatic speed governing action is taking place as the speed of shaft 32 increases, several factors combine to provide greater forces for turning the blades 38 to increase their pitch angle. Obviously as the plane speed increases the force required to turn the blades 38 relative to the hub 34 increases also. Referring to Fig. 9 as the pitch of blade 38 is increased the block 39 there shown in section moves in a counterclockwise direction which decreases the angle of the slot 39a with reference to the line of pin movement, also the lever arm of pin 40a with reference to the propeller axis becomes longer and the centrifugal force acting upon blocks 40 and weights 42 becomes greater, all of which combine to more easily turn the blades 38 in a direction to increase their pitch.

It will be noted that in Figs. 1 to 6, the slots 25b are linear while in Figs. 7 to 10 the slots 39a are curved. This illustrates that whatever the form of my device the controlling slots or cams may be formed to take into account the many variables which determine the proper blade pitch for various speeds of shaft 32. These variables include the twisting moment on the propeller blade, the centrifugal force necessary to overcome this moment, the centrifugal force necessary to overcome friction and other variables which will occur to those skilled in this art.

It should be noted that in either form of my device if one of the springs 28 or 43 should break nevertheless the device will perform as intended because the other of the two springs will control the position of its pitch controlling block and since both blocks are rigidly interlocked to move together, as I have already described, the pitch of the two blades will be controlled by the movement of the one block which is functioning.

It should be mentioned with respect to the locking member 60 of the second modification that this lock is thrown out as previously described when the plane attains cruising speed, but at some slower speed say when the plane is coming in to make a landing, the member 60 will again move into locking position when the spring 47 permits it and when the hole 46 in block 40 is in registration with the pin 45 carried by block 39. Therefore if the pilot should find conditions unsuitable for landing the propeller blades are again locked in position of minimum pitch so that the pilot may gun the engine and climb for a second attempt at landing.

Another manner of securing a standard propeller blade to my improved hub is shown in Fig. 11. Here the blade 50 has a cup-shaped end 50a which enters the hub 13', similar to hub 13. A thrust nut 51 is threaded into the end 50a at 52 and further secured by set screw 53. A thrust bearing 54 is held between nut 51 and shoulders 55 of hub 13'. Needle bearings 56 lie between hub 13' and the blade end 50a. Spring housings 27 connected with the hub 13' may be like those described in Figs. 1 to 6. Pins or slots may be carried by nut 51 and the corresponding part by blocks like 25 or 40. Here slots 39a are shown in nut 51 and pins would be carried by blocks analogous to 25 or 40 and moving against springs in housings 27. The pitch-varying mechanism would be like those already described.

In the form of device shown in Figs. 7 to 10, I have shown a streamlined cap 61 on the forward side of my improved hub. Obviously the device of Figs. 1 to 6 may be designed to reduce the turbulence near the propeller hub by one skilled in this art.

What I claim is:

1. In a variable pitch propeller, the combination of an engine shaft, a hub rotatable with said shaft, two axially alined propeller blades carried by said hub with their inner ends spaced apart, said blades having mountings in said hub preventing axial movement of said blades and permitting blade rotation to vary the blade pitch angle, rigid pitch-controlling block members one on each side of said shaft and movable at right angles to the axes of said blades in the space between the inner ends of said blades, block members rigid with the inner ends of said blades, interlocking cam and follower pairs forming operative connections between each of said first named block members and each of said second named block members so arranged that movement of said pitch-controlling members away from said shaft turns said blades in pitch-increasing direction, and yieldable means resisting said movement of said pitch-controlling members.

2. The combination of claim 1 wherein each of said pitch-controlling block members has a hollow stem extending away from said shaft, a weight in said hollow stem, means for holding said weight in various positions relative to said shaft, said yieldable means comprising a helical spring surrounding said stem, and means for adjusting the tension of said spring.

3. In a variable pitch propeller, the combination of an engine shaft, a hub rotatable with said shaft, a pair of axially alined propeller blades carried by said hub, said blades having mountings in said hub preventing axial movement of said blades and permitting blade rotation to vary the blade pitch angle, pitch controlling members mounted in said hub between said blades for movement at right angles to the axis of said blades and radially toward and away from said shaft, and coacting inclined slot members and pin members on said controlling members and on the inner ends of said blades respectively so constructed and arranged that lineal movement of said controlling members outwardly from said shaft causes rotation of said blades in said hub to increase blade pitch as said shaft speed increases, whereby the said controlling members exert their blade controlling force on a greater lever arm with respect to said blade axis as the speed of the shaft and the pitch of the blades increase.

4. In a variable pitch propeller, the combination of an engine shaft, a hub rotatable with said shaft, a plurality of propeller blades carried by said hub substantially in a common plane, said blades having mountings in said hub preventing axial movement of said blades and permitting blade rotation to vary the blade pitch angle, pitch controlling members mounted in said hub for lineal movement substantially parallel to said plane toward and away from said shaft only, yieldable means resisting movement of said controlling members away from said shaft, pins on said controlling members movable with the latter in a radial direction with reference to said shaft, slotted members on the inner ends of said blades adapted to receive said pins in their slots, and the slots in said last named members being curved so that the angle of the slot with reference to a radial plane about said shaft decreases as the slotted member and the associated propeller blade rotate to increase blade pitch.

EDWARD W. PERRY.